United States Patent Office 3,105,036
Patented Sept. 24, 1963

3,105,036
PRESSURIZED WATER REACTOR CORE WITH PLUTONIUM BURNUP
Karl H. Puechl, Pitcairn, Pa., assignor, by mesne assignments, to the United States of America as represented by the United States Atomic Energy Commission
Filed Sept. 5, 1961, Ser. No. 142,470
1 Claim. (Cl. 204—193.2)

This invention relates to the nuclear power art and has particular relationship to nuclear reactors. Nuclear reactors in accordance with the teachings of the prior art have the serious deficiency that a relatively large portion of the reactivity available from the fuel is wasted in maintaining the reactor operating in the useful power generation range. The difficulty arises from the fact that the reactivity is normally decreased during operation by the generation of fission products which absorb the neutrons. With an initial low reactivity the reactor operation would come to a stop in a short time. To reduce the cost of frequent replacement of fuel the life of the fuel assembly must be long and reactors must have a high initial reactivity. To prevent a runaway chain reaction or to allow operation at constant desired power output it is necessary that the reactivity factor, usually designated $k_{eff}$, be regulated to 1. This object is in part accomplished by providing the reactor with control rods which are in maximum neutron absorbing setting at the start of the operation and are gradually removed as the operation proceeds and the reactivity decreases. The control rods absorb a substantial part of the reactivity producing neutrons and this is a substantial loss in available power per unit fuel charge and a resulting increase in cost of fuel. In addition because of space limitations the relative control rod volumn cannot be made large enough to reduce the reactivity sufficiently particularly during initial operation when the uncontrolled reactivity would be high. Burnable poisons are then added. These poisons absorb neutrons and are converted into elements having smaller poisoning effect thus compensating for the reduction in reactivity of the fuel. But the conversion of the poisons is a loss of reactivity producing neutrons, and does not yield useful power. The available power per unit fuel charge of the reactor is then reduced as in the operation of control rods.

It is a principal object of this invention to improve the efficiency of nuclear reactor operation by reducing the neuron loss resulting from the use of control rods and burnable poisons and it is another object of this invention to provide a nuclear reactor having a higher available power per unit fuel charge than those of the prior art by reason of the suppression of such loss.

This invention in its specific most important aspect concerns itself with the element plutonium of which the isotopes, Pu-239, Pu-240, Pu-241 are of particular interest in the practice of this invention. Pu-239 and Pu-241 are fissile and Pu-240 is not. Pu-239 sometimes fissions and is sometimes converted into Pu-240 by absorbing a neutron. Pu-240 is converted into Pu-241 by absorbing a neutron.

Plutonium may be produced in a reactor that includes U-238. The U-238 is converted into neptunium which in turn is converted into plutonium. The percentage content of the different isotopes of plutonium in any mass of the element depends on the properties of the reactor in which the plutonium is produced and on the time of reaction and may vary over a wide range.

This invention arises from the realization that Pu-240 has a strong neutron resonance-capture peak at 1.055 electron volts. The effective microscopic cross section of Pu-240 to neutrons is then strongly affected by the neutron energy and may be set to decrease as the energy of the neutrons averaged over the whole spectrum decreases (the average speed of the neutrons decreases). This effect is manifested by the phenomenon that over certain ranges of plutonium content in a reactor or over certain ranges of moderation of the reactor the Pu-240 microscopic cross section decreases as the plutonium content decreases, that is an plutonium is burned up. This may be described as the "negative resistance" range. Plutonium content means the total mass of all isotopes of plutonium in a reactor at any time. This content may decrease during the operation of the reactor because the fissible isotopes Pu-239 and Pu-241 are broken up; at the same time the Pu-240 content may increase.

This invention contemplates the tailoring of the effective cross section of Pu-240 to minimize inherently the reactivity variation of a reactor during irradiation. This may be accomplished by causing excess neutrons to be absorbed preferentially in the Pu-240 thereby yielding the fissile isotope Pu-241 rather than by having them adsorbed in a strictly parasitic control material (poison) or rather than by having them leak from the reactor.

In accordance with this invention then a reactor is provided including plutonium which is included in quantities such that, or, is moderated, so that, it is in the range where the cross section of Pu-240 decreases as the plutonium content decreases. Thus in this range, by virtue of the decreasing cross section of Pu-240 as the average neutron energy decreases during fuel consumption, the plutonium becomes a self stabilizing or self compensating fuel. The quantity of the plutonium, its isotopic composition and the moderation of the reactor should thus be such as to compensate for the loss of reactivity of the fuel as the reactor operates.

In a typical situation a mass of plutonium having an initial composition Pu-239—78%, Pu-240—12% and Pu-241—10% may be used in a reactor including source material such as U-238 and/or thorium Th-232. The Pu-239 and Pu-241 being fissile may be sufficient by themselves to sustain the necessary chain reaction or may be augmented by U-235 and/or U-233. During operation of this reactor some of the Pu-239 is fissioned and some is continuously converted into Pu-240 which in turn is continuously converted into Pu-241. The continuous conversion maintains the content of the Pu-240 about constant. In addition during operation the average neutron energy decreases, decreasing the effective microscopic cross section of the Pu-240. The macroscopic cross section of the Pu-240, the product of the effective microscopic cross section and the mass of Pu-240, then also decreases stabilizing the operation of the reactor over a long time interval.

Using standard Atomic Energy Commission cost bases including the suggested AEC plutonium price of $12/gram, and assuming that plutonium-contained fuel elements will cost twice as much to fabricate as comparable uranium fuel elements, economic studies indicate that in the practice of this invention total fuel cycle costs below 2 mills/kwh. may be attainable with central-station power plants.

This invention may be viewed in another way by considering the effects of burnout of fuel in a reactor. Two major and related effects of fuel burnout are decrease in neutron temperature (average speed) and decrease in the number of neutrons having epithermal energies (above 0.6 electron volt) relative to those having thermal energies. In accordance with this invention isotopes of plutonium are so used that the combination of these two effects results in decreasing with fuel burnout the effective neutron absorption cross section of Pu-240. This advantageous cross section behavior can be used to balance out the steadily increasing parasitic absorption that occurs due to fission product buildup. This combination of effects tends to keep the reactivity from falling rapidly; in fact, under certain conditions the reactivity may initially increase.

In addition to Pu-240, Pu-242 and Am-241 and to a small extent U-238 manifest the above-described property of having an effective cross section which decreases as the average neutron energy decreases. To the extent that this invention may be practiced with Pu-242, Am-241, and U-238 such practice is within its broader scope. But the important aspect of this invention in its specific aspects is the use of the Pu-240 and the feasibility of possible other elements can in no way detract from the importance of the Pu-240 aspect of this invention.

It is not a requirement for all isotopes present in a reactor to exhibit similar behavior to the Pu-240; the only requirement is that this behavior, even if exhibited by only one isotope, is sufficiently pronounced so as to influence the reactivity in "negative resistance" fashion; i.e., so that the addition of more fuel results in decreasing reactivity.

This invention is directed to the use of plutonium fuels in neutronic reactors that are so designed that operation is possible in the "negative resistance" range. This includes within the broad aspects of this invention, reactors that initially contain only plutonium as a fuel and also reactors that contain other fuel or fissile and source materials as well.

This invention also contemplates within its scope reactor core design features and process conditions that allow for generally higher performance operation of these neutronic reactor systems. Specifically, further neutron conservations can be achieved by radial-zoned core loading with:

(a) The same lattice spacing in each zone, but with progressively lower enrichments of plutonium from zone to zone from the periphery to the center of the core, or
(b) With the same fuel enrichment in each zone, but with progressively greater degrees of moderation from zone to zone from the periphery to the center of the core.

Further, similar neutron conservation can be achieved with a uniform core loading by utilizing multi-pass moderator cooling with the first pass through the central portion of the core and other passes extending from the center through consecutive zones to the periphery.

In certain situations neutron conservation is of secondary importance compared to uniform spacial distribution of power output throughout the reactor. In such situations the converse to the procedures described in the above paragraph are adopted.

Further improvement in performance can be attained by forcing the neutron spectrum to vary in the most desirable fashion throughout operation. This can be achieved by:

(a) Controlling the moderator and/or coolant temperature,
(b) Adjusting moderator properties by intermixing moderators,
(c) Adjusting moderator density.

Each of these features is a means for attaining neutron spectral shift control; thereby, a means for further reducing shim or burnable poison control requirements. The effect of moderation on reactivity is so strong for these systems that any of these mechanisms, either alone or in combination, can produce pronounced effects on the reactivity.

The novel features considered characteristic of this invention are disclosed generally above. The invention, both as to its organization and as to its method of operation, together with additional objects and advantages thereof, will be better understood from the following detailed description of preferred embodiments of this invention and of certain of the important features of this invention taken in connection with the accompanying drawings, in which:

Figure 1:
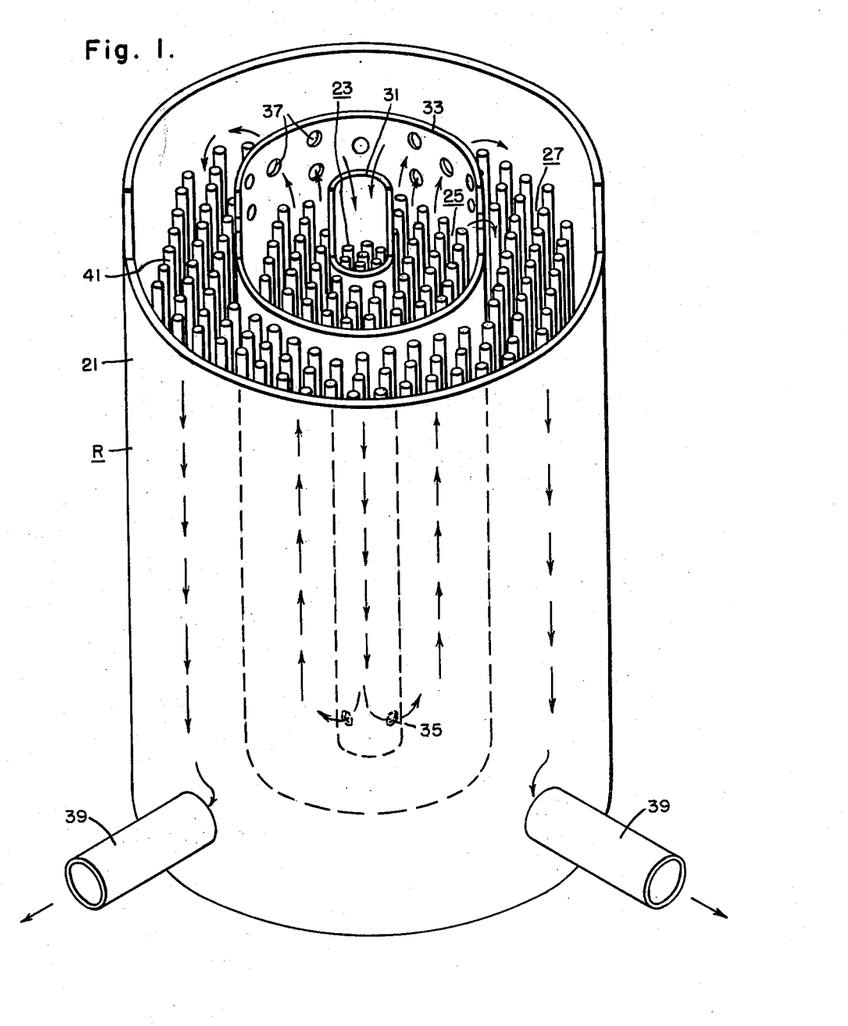
FIGURE 1 is a view in perspective with wall parts broken away of an embodiment of this invention.

The apparatus shown in FIG. 1 is a reactor core R of generally cylindrical section including a sealed container 21 or chamber subdivided into zones 23, 25 and 27 separated by tubular walls or tubes 31 and 33. Walls 31 has openings 35 at the bottom and wall 33 has openings 37 at the top. The container 21 is provided with fluid exit tubes 39. Cooling fluid is supplied to tube 31 flowing downwardly through this tube and through the openings 35 in the space between tubes 31 and 33 then upwardly through the opening 37 into the space between tube 33 and wall 21 then downwardly and through the outlet tubes 39 usually to a heat exchanger where the heat is transferred to a non-radioactive coolant for subsequent useable power generation.

Each of the zones 23, 25 and 27 includes a plurality of fuel elements 41. These may take different forms but in the reactor shown are rods, preferably of stainless steel or zircaloy or a like element in which pellets of the fuel are enclosed. In accordance with this invention the pellets include plutonium in the composition range in which "negative resistance" effect is produced. The "negative resistance" effect is in part determined by the character of the moderator and the magnitude of the moderator.

Typically the coolant may be water at a high temperature (600° F.) and a high pressure (2000 lb. per sq. inch). This water alone or with heavy water (deuterium) or various compositions may serve as moderator. In other reactors to which this invention is applicable the coolant may be liquid sodium or other liquid metal and graphite or beryllium may be used as the moderator. The main coolant may flow through tubes enclosing the fuel rods and the graphite or beryllium may enclose these tubes. A separate cooling system may be provided to cool the moderator; i.e., other coolant tubes and coolant may be provided in the moderator.

Figure 2:
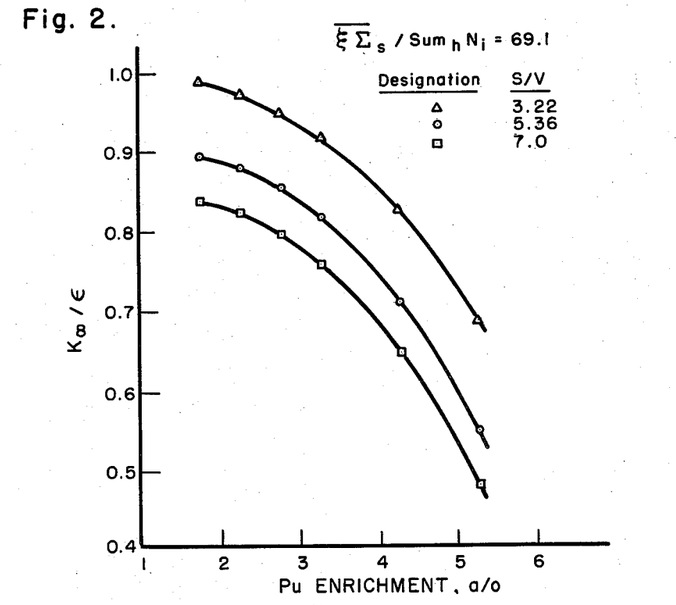
FIGURES 2 through 16 are graphs showing the properties of fuel or source material such as plutonium on which this invention depends.

The plutonium enrichment used in the practice of this invention is such as to produce the "negative resistance" characteristic and may be determined from the curves in FIGS. 2 through 6. In FIG. 2 a measure of the initial reactivity $k\infty/\epsilon$ is plotted as a function of the plutonium enrichment (plutonium mass relative to normal uranium mass) expressed in percent of number of atoms $a/0$. In the expression $k\infty/\epsilon$ $k\infty$ is the reactivity of an infinite mass, that is assuming no leakage of neutrons, and $\epsilon$ is the fast fission factor, that is, the ratio of the number of neutrons degrading below the U-238 fission threshold to the number of neutrons formed by fissions. The curves are plotted for reactors in which the expression $$\overline{\xi \Sigma_s}/\text{Sum}_h N_i = 69.1$$

in which $\xi$ = Average logarithmic neutron energy loss per collision.
$\Sigma_s$ = Macroscopic scattering cross section averaged over all materials in the reactor.

The line over $\overline{\xi \Sigma_s}$ means that the average is taken. $\text{Sum}_h N_i$ is the total number of heavy atoms.

The expression $\overline{\xi \Sigma_s}/\text{Sum}_h N_i$ is called the lattice parameter. For a tight lattice where the fuel elements are near each other the lattice parameter is lower than for a loose lattice where the fuel elements are spaced and there is substantial moderation.

FIG. 2 presents three curves for three different ratios of surface area to volume ($S/V$) of fuel. Each curve shows that over the range covered the reactivity decreases as the plutonium enrichment increases. That is during reactor operation in the range disclosed and under the circumstances of moderation disclosed the reactivity would tend to increase as the plutonium enrichment is decreased, that is, as the plutonium is burned. A compensating or stabilizing effect would thus be produced to counterbalance the tendency for the reactivity to decrease with fission product buildup.

Figure 3:
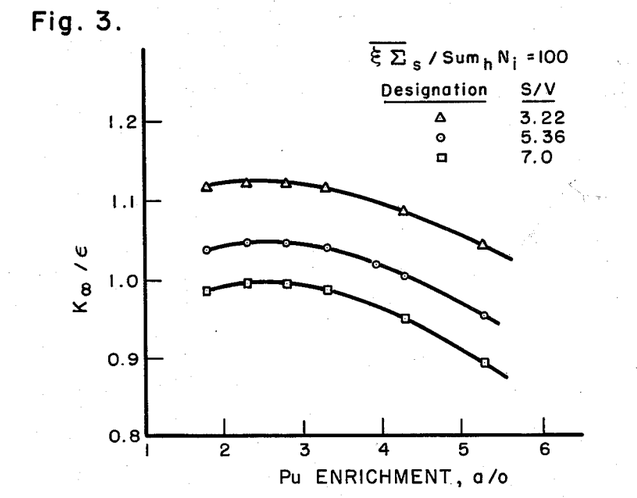

FIG. 3 presents three like curves for $\overline{\xi\Sigma_s}/\text{Sum}_h N_i = 100$. In this case the drop in the curves necessary for the practice of this invention starts at about 2.8 atom percent plutonium enrichment.

Figure 4:
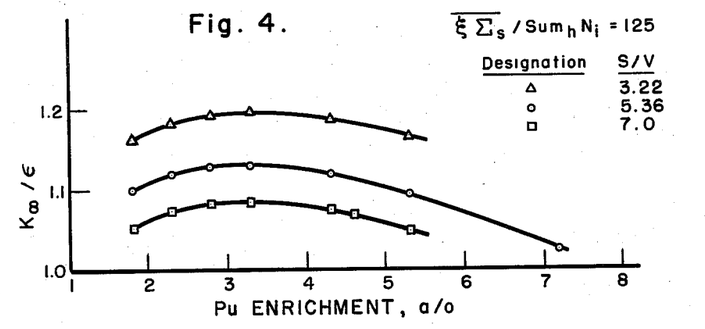

FIG. 4 presents curves for $\overline{\xi\Sigma_s}/\text{Sum}_h N_i = 125$. This shows both the useful range of enrichment beginning about 4 for $S/V = 3.22$, and about 3.5 or 3.6 for $S/V = 5.36$ and 7, and the range of enrichment which is not useful in the practice of this invention, less than 4 for $S/V = 3.22$ and less than about 3.5 or 3.6 for the others.

Figure 5:
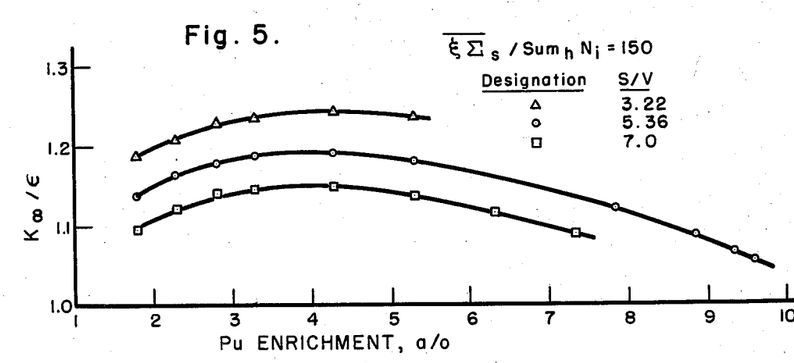
Figure 6:
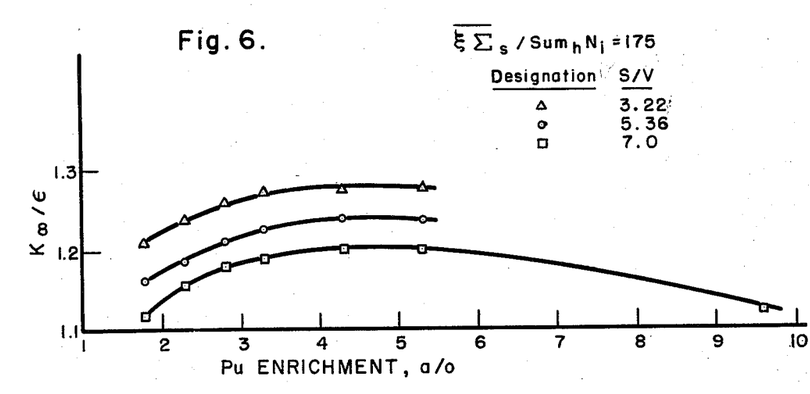

FIG. 5 presents the curves for lattice parameter 150. In this case the useful range of enrichment starts at about 4.5 atoms percent. FIG. 6 presents the curves for lattice parameter 175.

In the practice of this invention the plutonium enrichment in the fuel elements or the moderator is set so that for the lattice parameter corresponding to the core the operation is in the useful range defined above with reference to FIGS. 2 through 6. Under such circumstances the life of the reactor is materially increased.

Figure 7:
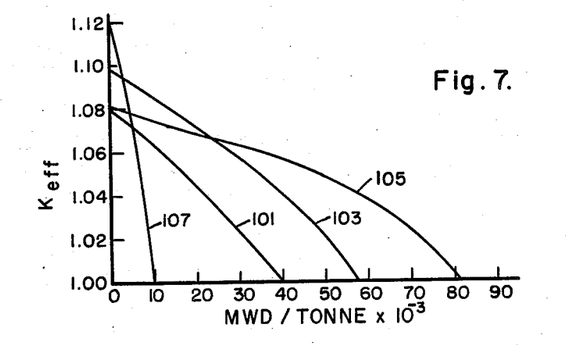

In FIG. 7 the $k_{\text{eff}}$, which is the uncontrolled reactivity of the reactor, is plotted as a function of the reactor operating time in megawatt-days per metric ton of fuel for several reactor core types in accordance with this invention and for a prior art core. Cores 101, 103, 105 correspond to a reactor according to this invention and curve 107 to a prior art reactor. The life of the reactor terminates when the curve crosses the ordinate $k_{\text{eff}} = 1$. The lives of the cores according to this invention are substantially larger than for the prior art core.

Figure 8:
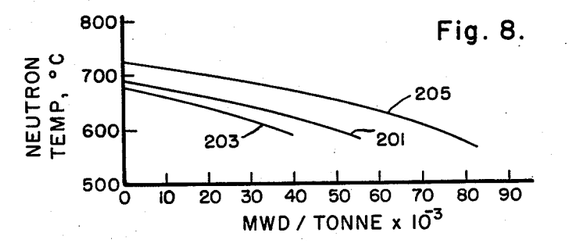

In FIG. 8 the neutron temperature, a measure of the average speed of thermal neutrons, is plotted against megawatt days/metric ton for three typical reactor core types in accordance with this invention. The exhibited trend of decreasing neutron temperature with reactor operating time is in part responsible for the decreasing of the Pu-240 absorption cross section with operating time.

Figure 9:
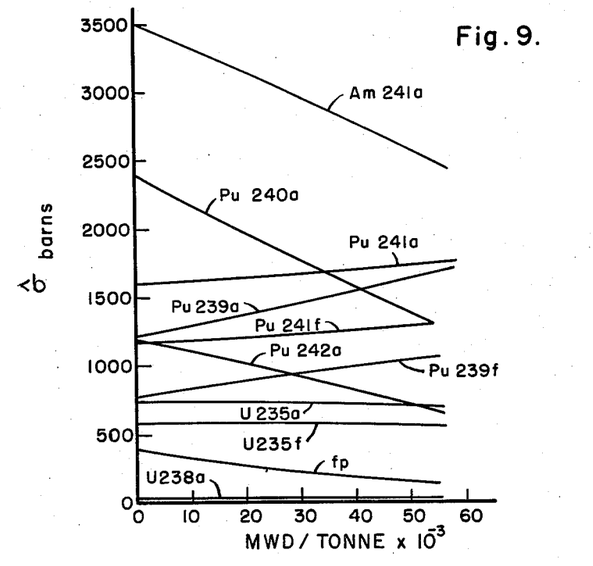

In FIG. 9 the effective cross section, $\sigma$ is plotted as a function of megawatt days/per metric ton for the various components and products of a reactor in accordance with this invention. Each curve is labeled to correspond to the component or product to which it corresponds and each label is followed by the letter "$a$" or "$f$". The letter "$a$" means that the curve corresponds to the total absorption cross section and "$f$" that the curve corresponds to the "fission" cross section. The absorption cross section may be defined as the fission cross section plus the capture cross section. The curve $fp$ is for the composite fission products cross section, that is for the totality of the fission products generated. The data for the curves is derived by determining the effect of the changing neutron spectrum that results from the operation of the reactor.

The significant aspect of FIG. 9 is that the cross section curves for Am-241$a$, Pu-240$a$, Pu-242$a$ and to a small extent U-238$a$ have negative slopes. For these materials then the cross section decreases as the reactor operates. The decrease in these cross sections serves to compensate for the build up of fission products and thereby the reactivity of the reactor is prevented from decreasing rapidly.

Figure 10:
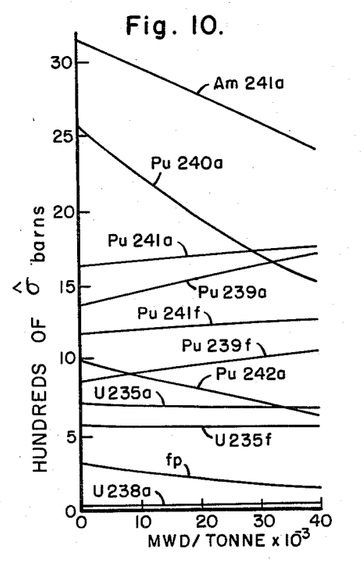
Figure 11:
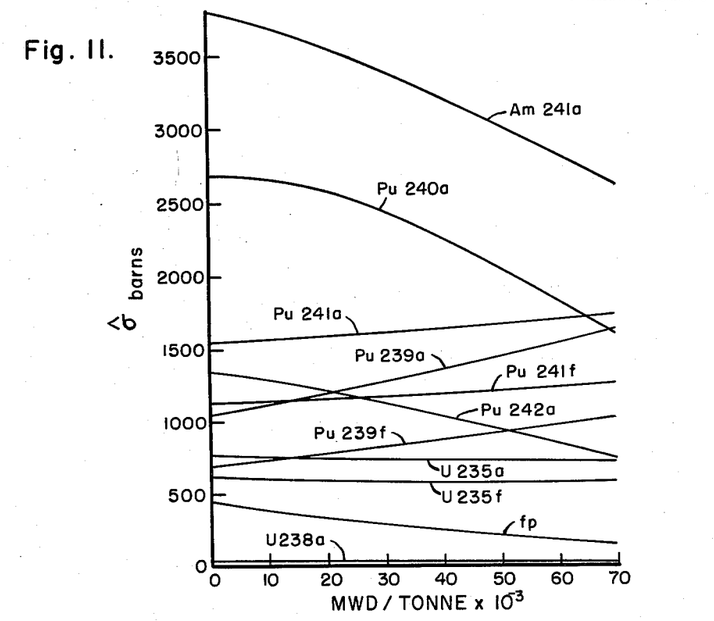

FIGURES 10 and 11 are similar graphs for other reactors. The decrease in the cross section of Pu-240$a$ is seen to be very marked.

The practice of this invention affords remarkable flexibility in setting the properties of the reactor as described by varying the plutonium enrichment or the moderation or both. To conserve neutrons the initial plutonium enrichment of each zone 23, 25, 27 (FIG. 1) may be set to increase as a function of the distance of each zone from the center; that is, zone 23 has the lowest enrichment, zone 25 an intermediate enrichment and zone 27 the highest. The enrichment is so set in accordance with this invention that the local reactivitiy is the highest in zone 23 and the lowest in zone 27. The respective lower reactive zones then prevent the neutrons produced in the respective higher reactive zones from leaking out of the reactor.

Conversely, where special variation of power output throughout the reactor is to be reduced the plutonium enrichment may decrease from the inner zone 23 outwardly. In this case the local reactivity is a maximum at the periphery and smaller in the inner zone. This smooths out the power output.

In both cases just discussed the plutonium enrichment in each zone may be varied in accordance with the described patterns. That is, the fuel rods of each zone may increase or decrease in enrichment as a function of the position of the rods from the center of the core R.

The conservation of neutrons may also be effected in a reactor in which the plutonium enrichment is constant throughout by decreasing the moderation as a function of the distance from the center of the reactor. This may be effected in a pressurized water reactor by circulating the water as shown in FIG. 1 so that the water of the outside zone 27 is hotter than the water of the inside zone 23. The moderation varies inversely as the temperature of the water. The same result may be achieved by spacing the rods in the outer zone 27 nearer each other, than the rods in zone 25, and the rods in zone 25 nearer each other than the rods in zone 23. The same spacing pattern may be adopted within the zones.

Conversely for reduced spacial variations in power output the flow of the water or the rod spacing pattern may be reversed.

In addition to spacial control, time control can also be achieved in accordance with this invention. By varying the quantity of heavy water in the normal water coolant as a function of time the neutron temperature may be varied as a desired function of time to smooth out the reactivity as the reaction proceeds. The same effect may be produced by regulating the coolant temperature as a function of time. This variation need not affect the load temperature materially since the moderation of the coolant can be varied over a wide range by changing the coolant temperature only a few degrees. Also a separate cooling system may be supplied to the moderator, thereby allowing moderator temperature regulation without influencing the load temperature.

While this invention has been disclosed herein as applied to a zoned reactor, in its broader aspects, it is equally applicable to a uniformly loaded reactor.

Detailed discussion of the graphs presented here may serve as a further aid in the understanding of this invention.

FIGS. 2 through 6 show the variation of $k_\infty/\epsilon$ with plutonium enrichment and lattice parameters for 100 reactor compositions calculated where each composition contained plutonium and normal uranium as the fuel. The striking discovery on which this invention is based is that beyond a certain plutonium enrichment $k_\infty/\epsilon$ decreases with further enrichment. For the tightest lattices, the maximum value of $k_\infty/\epsilon$ occurs when the plutonium enrichment is relatively low (<2.0 a/0) and $k_\infty/\epsilon$ never becomes very large; e.g., for the lattice having $\overline{\xi\Sigma_s}/\text{Sum}_h N_i = 69.1$ and $S/V = 5.36$, the maximum value of $k_\infty/\epsilon$ is only about 0.9, and this occurs at an enrichment of less than 1.7 a/0 Pu. For the looser lattices, $k_\infty/\epsilon$ can be appreciably greater than unity and the peak values occur at relatively high enrichments; e.g., for the lattice having $\overline{\xi\Sigma_s}\text{Sum}_h N_i = 175$ and $S/V = 3.22$, the maximum value of $k_\infty/\epsilon$ is 1.28, and this occurs at an enrichment of about 4.5 a/0 plutonium. Between these two extremes, one can find a lattice and appropriate enrichment which will be a critical condition for any reactor of reasonable size. As one would expect, increased surface resonance absorption decreases $k_\infty/\epsilon$ for the smaller fuel rod sizes. But the variation of $k_\infty/\epsilon$ with enrichment is essentially the same for all rod sizes. This indicates that the general variation of reactivity with enrichment is due primarily to an effect on volume absorption, either thermal, or resonance or both. The initial reactivity increase with enrichment is due to the increase in thermal absorption in the additional Pu-239; this, however, is soon overshadowed by the general increase in non-fissioning absorption due to the increase in neutron temperature that results from an increase in the average core absorption cross section. Intercomparison of FIGS. 2 through 6 shows that for a specific plutonium enrichment and fuel rod size, $k_\infty/\epsilon$ increases with increased moderation over the range considered. This again illustrates the strong influence of neutron temperature on non-fissioning absorption. These observations lead to the following concepts:

(a) The core of a reactor initially loaded with a plutonium enrichment greater than that necessary to yield the highest value of $k_\infty/\epsilon$ has a relatively long life (reactivity-wise) since the fission product buildup will be counteracted to an extent by the trend towards higher reactivity with burnout (decreasing enrichment). Further, the reactivity variation during core life will be relatively small due to the balancing of these opposing effects.

(b) Because of the general decrease in $k_\infty/\epsilon$ with tightening of the lattice the water moderated systems have strong negative temperature coefficients of reactivity. Further, since there is a reduction in reactivity with an increase in neutron temperature, systems having stationary moderators will have negative temperature coefficients also even though no moderator expulsion results from an increase in moderator temperature.

FIGS. 2 through 6 are derived from reactors in which the plutonium composition is 78% Pu-239, 12% Pu-240, and 10% Pu-241. The concepts developed here apply equally to plutonium of different compositions. The Pu-240 component must in each case be adequate to produce the "negative resistance" effect. It is believed that the Pu-240 isotopic content of the plutonium should exceed about 10%.

A study of the burnout behavior of a large number of reactors indicates first, that for a specific enrichment and moderation, the core life at $S/V=5.36$ is greater than the corresponding value at $S/V=7.0$; i.e., for a specific enrichment and moderation one can achieve a longer core life with a larger fuel rod. Second, for a particular degree of moderation and specific rod size there exists an enrichment that results in maximum core life. This maximum core life is greater for a greater degree of moderation (over the range considered). But the greater the moderation, the greater the enrichment required to achieve this maximum. Third, the attainable core life for a particular rod size and moderation increases relatively slowly with enrichment until a maximum is reached, at which time the attainable core life drops off rapidly with a further increase in enrichment. Fourth, there is a general trend of increasing core life with enrichment. For a particular lattice, the initial $k_{\text{eff}}$ is generally greater, the lower the enrichment. This is as anticipated from FIGS. 2 through 6. This also shows that for approximately the same desired core life, the shim control requirements are greater for the low enrichments. An economic balance can, then, be made between higher inventory requirements and reduced shim control needs. More generally, extremely long core lives (assuming that the fuel rods will resist radiation damage) are attainable with only moderate shim control requirements. The following Table I presents the results of burnout studies on various reactors containing plutonium and normal uranium as the fuel in accordance with this invention.

TABLE I

*Pertinent Results of Burnout Studies*

| Case No. | Lattice [1] parameters | Initial Pu enrichment a/0 | Core life MWD/Tonne | Initial $k_{\text{eff}}$ | Final [2] Pu enrichment a/0 | Final Pu [3] isotopic composition a/0 | Net Pu change kg./Tonne | Final U [4] enrichment a/0 | Net U change kg./Tonne |
|---|---|---|---|---|---|---|---|---|---|
| 1 | 5.36<br>150<br>2.84<br>3.0 | 7.84 | 57,500 | 1.0983 | 5.52 | 49.6<br>22.4<br>19.0<br>9.0 | 26.9 | 0.346 | 28 |
| 2 |  | 8.85 | 61,300 | 1.0610 | 6.50 | 53.9<br>18.5<br>18.9<br>8.7 | 27.6 | 0.342 | 34 |
| 3 | 7.00<br>175<br>3.31<br>3.92 | 9.60 | 64,300 | 1.0799 | 6.65 | 49.8<br>21.1<br>19.7<br>9.4 | 34.4 | 0.346 | 34 |
| 4 | 7.00<br>150<br>2.84<br>3.92 | 6.33 | 39,400 | 1.0806 | 4.90 | 53.6<br>20.8<br>19.0<br>6.6 | 17.3 | 0.413 | 24 |
| 5 |  | 7.34 | 42,800 | 1.0552 | 5.71 | 56.2<br>18.1<br>19.2<br>6.5 | 18.8 | 0.410 | 26 |
| 6 | 7.00<br>125<br>2.35<br>3.92 | 4.57 | 14,100 | 1.0362 | 4.21 | 67.6<br>15.2<br>15.2<br>2.0 | 4.5 | 0.574 | 11 |
| 7 | 5.36<br>125<br>0.235<br>0.30 | 7.84 | 81,700 | 1.0813 | 5.15 | 45.4<br>19.0<br>19.6<br>16.0 | 26.9 | 0.232 | 48 |

[1] In order: $S/V$, $\bar{\xi}\Sigma_s/\text{Sum}_h N_i$, $(\Sigma_a)$ mod/$\text{Sum}_h N_i$, $(\Sigma_a)$ clad/$\text{Sum}_h N_i$.
[2] Defined as atoms of Pu/atoms of Pu+U.
[3] In order: Pu-239, Pu-240, Pu-241, Pu-242.
[4] Defined as atoms U-235/atoms U.

Case 2 in Table I has a core life of 61,300 MWD/Tonne with an associated reactivity variation of only 0.061 in $k_{\text{eff}}$. Similarly, case 5 has a core life of 42,800 MWD/Tonne with only 0.055 in $k_{\text{eff}}$ required to be shimmed. Also, to be noted in Table I are the changes in plutonium and uranium content that occur over the attainable by initial dilution of H₂O with D₂O. It is pointed out that this variation in $\bar{\xi\Sigma_s}/Sum_hN_i$ can also be obtained by increasing the average moderator temperature (considering H₂O) by about 70° C. Of course, such a temperature increase would not be required since the temperature increase effects the neutron temperature directly and not only through its action on moderator density considered here. A more reasonable estimate of the temperature change required can be obtained from the temperature coefficient results given in Table II. The results shown for case 1, which is similar to case 4 being considered here, indicate that a 42.5° C. increase in operating temperature would be required to hold down 0.0806 in $k$. Again leakage considerations would indicate that the temperature increment required is considerably less.

Under proper design conditions the "negative resistance" effect can also be achieved with pure plutonium U-235 and/or U-233 fueled systems, i.e., with straight burner reactors containing no source material such as U-238 or Th-232. Such reactors also exhibit an increase in reactivity with decreasing fuel concentration for the proper lattice configuration. Here again a relatively long core life can be obtained with a nominal shim control requirement.

Figure 15:
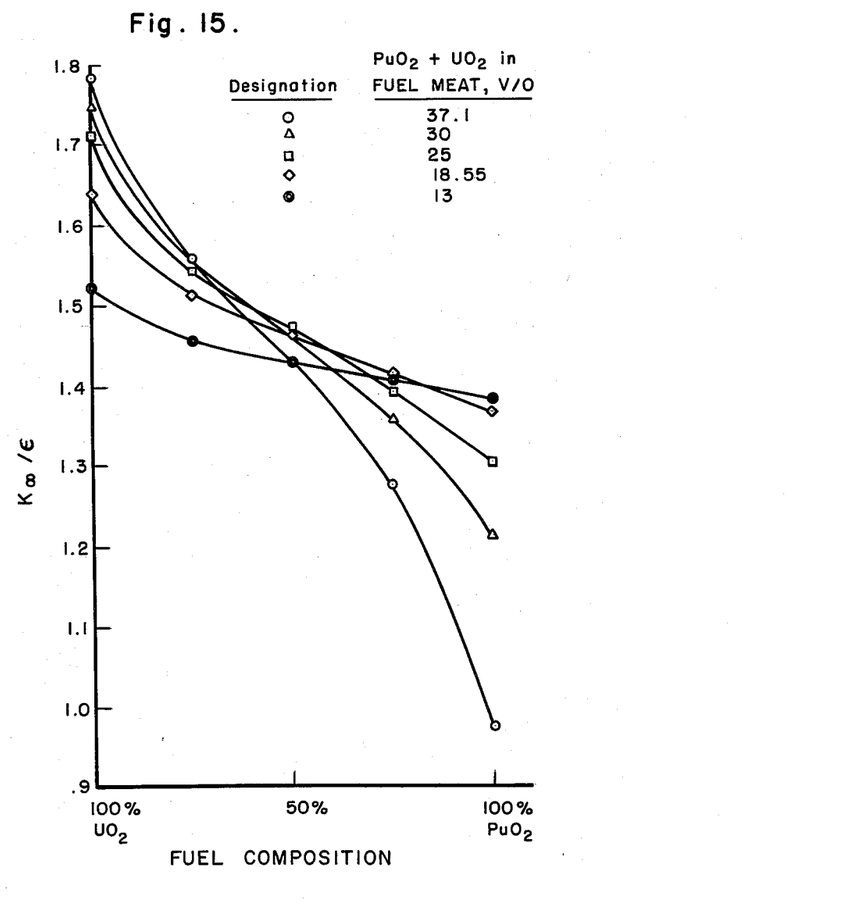

FIG. 15 shows the initial reactivity as a function of fuel loading and fuel composition for a particular lattice. The fuel consists of U-235 and the plutonium isotopes 239, 240, 241, 242. FIG. 15 shows that for compositions in which the plutonium exceed about 40% of the total fuel, the reactivity decreases as the fuel loading is increased. The fuel loading is expressed in volume percent, $V/O$, of the fuel meat, where the "meat" is the portion of the fuel element occupied by the fuel isotopes, and the associated nuclearly inert structural material (steel or zircaloy).

Figure 16:
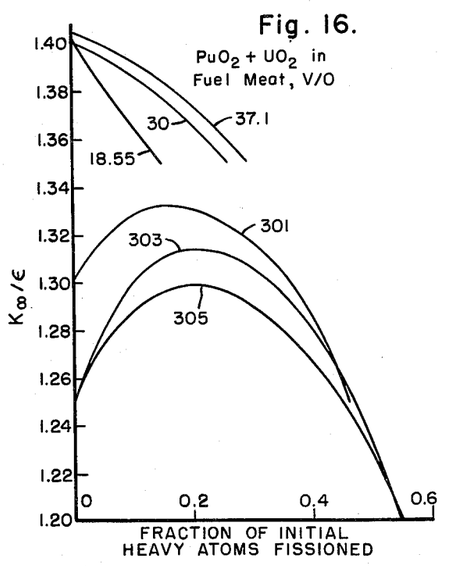

The effect of this "negative resistance" behavior is illustrated in FIG. 16. This shows the variation of reactivity throughout core life as a function of the fraction of initial heavy toms fissioned. It is seen that curves 301, 303, 305 show an actual increase in reactivity as operation proceeds.

To obtain a comparison of fuel cycle costs between plutonium fueled systems in accordance with this invention and prior art systems the economics of the entire fuel cycle were worked out for a number of the plutonium fueled cases and for the prior art reactors. To allow direct comparison with cost estimates made at other installations, the procedure outlined in the United States Atomic Energy Commission publication Costs of Nuclear Power (TID 8531, 1961) are followed throughout.

The following conditions were assumed for all reactors analyzed:

(a) Core loading—20 tonnes of heavy isotopes
(b) Net conversion efficiency—30%

In addition, calculations were performed for two cases: one having an average heat flux from the fuel of 100,000 B.t.u./hr.-ft.²/°F.-ft., in short a pressurized water reactor; the other having an average heat flux of 500,000 B.t.u./hr.-ft.²/°F.-ft., or in other words, 5 times the power density.

Three plutonium cases were analyzed; specifically, cases 1, 4, 7 (Table I) and these were compared to the uranium (prior art) case 8 and also to the APWR (prior art) design as given in Advanced Pressurized Water Study SW-1(1959).

For the uranium case, initial fuel fabrication costs were taken at $100/kg. of U; correspondingly, for plutonium cases 1 and 4 (steel clad elements) the costs were taken at $200/kg. of heavy isotopes; for the plutonium case 7 (zircaloy clad elements), the costs were taken at $300/kg.

In all cases, the AEC price schedule was used for UF₆ costs and plutonium value was taken to be $12/gm. as metal for all isotopic compositions.

For the plutonium cases, the uranium was expensed (handled similarly to fuel fabrication costs) since the spent fuel was depleted. For these cases, therefore, no post reprocessing charges were included for conversion of uranium nitrate to the hexafluoride. All other reprocessing costs, however, were ascertained on the basis given in "Cost of Nuclear Power." This includes charges for conversion of the plutonium nitrate to metal and associated losses, which is not a necessary step when plutonium recycling is considered. For this reason, the cost estimates for the high power density cases were performed on a more realistic basis; using a $0.50/gm. conversion cost, including losses, to go from plutonium nitrate to plutonium oxide.

To allow direct comparison with the cost estimates given in "Cost of Nuclear Power" no charges were included for the cost of money for working capital (fuel element fabrication and uranium costs for the Pu cases). Depending upon the capital structure of the utility considering such plants as these, these charges could add an additional 0.1 to 0.3 mills/kwh.

These costs are summarized in Table III.

TABLE III

*Fuel Cycle Costs*

| Case No. | Design and performance data | | | | | Costs in mills/kwh. | | | | | | |
|---|---|---|---|---|---|---|---|---|---|---|---|---|
| | Core¹ design data | Initial Pu content a/0 | Core life MWD/Tonne | Initial U enrichment a/0 | Heat flux B.t.u./hr. ft.²/°F.-ft. | Fuel element fabrication | Normal U | Chemical processing and conversion | Transport | Net burnup | Use charge | Total |
| 1 | 5.36 150 2.84 3.00 | 7.84 | 59,500 | Normal | 100,000 500,000 | 0.484 0.484 | 0.087 0.087 | 0.274 0.117 | 0.023 0.023 | 0.766 0.766 | 0.897 0.224 | 2.531 1.701 |
| 4 | 7 150 2.84 3.92 | 6.33 | 39,400 | Normal | 100,000 500,000 | 0.706 0.706 | 0.130 0.130 | 0.367 0.162 | 0.035 0.035 | 0.741 0.741 | 0.616 0.199 | 2.595 1.973 |
| 7 | 5.36 125 0.235 0.300 | 7.84 | 81,700 | Normal | 100,000 500,000 | 0.513 0.513 | 0.062 0.062 | 0.179 0.078 | 0.017 0.017 | 0.639 0.639 | 0.856 0.200 | 2.266 1.509 |
| Prior art, 8 | 5.36 69.1 1.30 3.0 | 0 | 7,550 | 3.4 | 100,000 500,000 | 1.839 1.839 | | 0.751 0.751 | 0.182 0.182 | 1.185 1.185 | 0.657 0.312 | 4.614 4.269 |
| Prior art, APWR | | 0 | 13,000 | 2.57, 3.36 | | 0.86 | | 0.352 | 0.036 | 0.892 | 0.770 | 2.91 |

¹ In order of: $S/V$, $\bar{\xi\Sigma_s}/Sum_hN_i$, $(\Sigma_a)$ mod/$sum_hN_i$, $(\Sigma_a)$ clad/$Sum_hN_i$.

life of the core, and the final isotopic compositions of the residual plutonium. In all cases, more uranium is burned than plutonium; the ratio, uranium/plutonium burned, decreases with increased core life. Therefore, aside from radiation damage considerations, there exists for a particular lattice an economically optimum core life that is appreciably lower than the maximum attainable.

It is to be noted that the residual uranium enrichment in the long lived cores is well depleted in U-235. This gives good indication that plutonium loaded cores will perform satisfactorily in accordance with this invention with depleted uranium as the diluent as well as with natural uranium. With the current availability of depleted uranium, such loadings might prove to be particularly advantageous.

The effect of utilizing a core with relatively low parasitic absorption in the moderator and cladding is shown in case 7 (Table I) wherein results are presented for one case having only about 10% of the parasitic absorption of the other lattices described in Table I. It is seen that the attainable core life is phenomenal, 81,700 MWD/Tonne with a shim control requirement of only 0.0813 in $k$. Also, it is to be noted that even with this long life, the amount of uranium burned is almost twice that of plutonium. No doubt, as indicated by the previous results, an economically optimum core of this type will have a lower enrichment, shorter life, lower shim requirement and relatively greater uranium conversion than the arbitrary case considered.

FIGS. 7 through 11 illustrate the detailed behavior throughout core life of several of the core types considered previously. Specifically, the characteristics of cases 1, 4 and 7 of Table I are illustrated. FIG. 7 shows the variation of $k_{eff}$ with time (in MWD/Tonne). Curve 103 corresponds to case 1, curve 101 to case 4 and curve 105 to case 7.

In FIG. 8 is shown the variation of the neutron temperature with time. Curves 201, 203, 205 correspond respectively to cases 1, 4 and 7 of Table I. It is seen that for all cases, the neutron temperature drops monotonically. This arises from the fact that the core absorption decreases as fissionable material is burned out without complete replacement by conversion. This decrease in neutron temperature tends to keep $k_{eff}$ from dropping since non-fissioning absorption especially in Pu-240 is thereby also decreased.

These effects are verified by the variation of the effective cross-sections with time, shown for the 3 cases (1, 4, 7) in FIGS. 9, 10, 11. The three isotopes, Am-241, Pu-240, Pu-242, that have the highest non-fissioning absorption cross-sections all show this exaggerated drop off of the effective cross-section with time or with decreasing neutron temperature. Of course, because of the relatively high concentration present, the Pu-240 has the only significant effect on reactor behavior. In comparison, the effective cross-sections of the other isotopes can be considered to be nearly constant throughout the life of the core.

Also to be noted in FIGS. 9, 10, 11, are the values for the effective fission product cross-sections. Initially, this cross-section is greater than $300b$/fission, ($b$ represents barns), and this is steadily reduced during core life to less than $200b$/fission. Again, this variation helps to keep the reactivity up.

Figure 12:
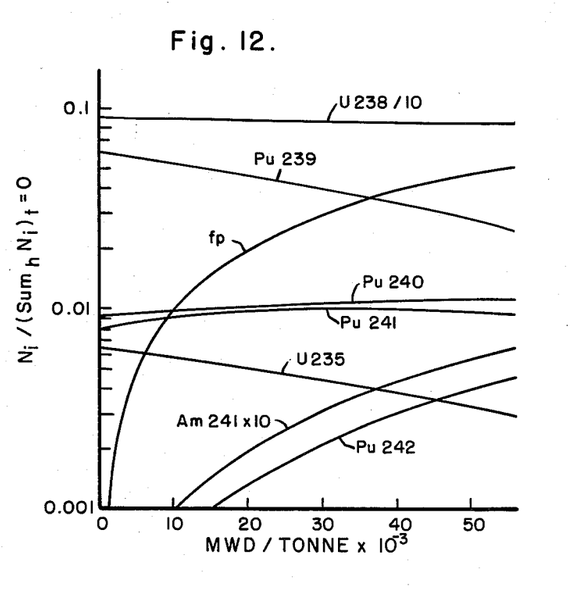
Figure 13:
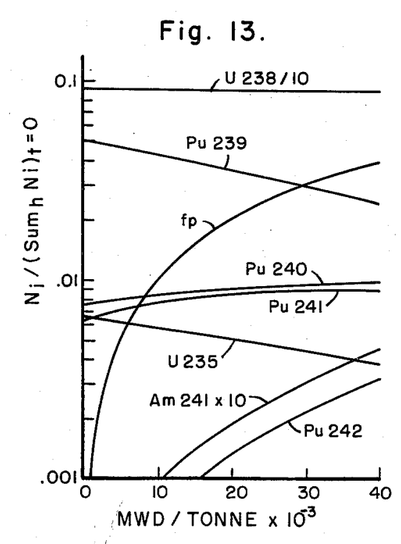
Figure 14:
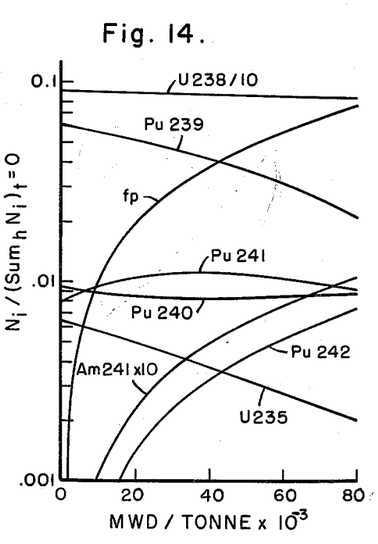

In FIGS. 12 through 14 are shown the variations in the core isotopic composition for the three cases. It is seen that the Pu-240 concentration does not change appreciably during the life of the core. The slight increase is due to the tendency for buildup resulting from the decreasing cross-section. This tendency is eventually counteracted by the decreased Pu-240 production that results from the decreasing concentration of Pu-239.

To obtain some indication regarding the stability of the systems in accordance with this invention, some temperature coefficients were calculated for cases 1 and 7. Since no leakage calculations were performed and since equilibrium fission product poisoning was taken to remain constant, these effects were not considered. Certainly as temperature is increased, leakage will increase, especially if the moderator is a liquid that expands appreciably. This neglected effect will, therefore, contribute a strong negative contribution to any calculated reactivity coefficients. On the other hand, in the temperature range of interest xenon absorption will probably decrease with increasing temperature. This will contribute a positive increment. For all cases considered, it is believed that the combined neglected effects will add a net negative contribution. Moderator coefficients were calculated separately at the start of core life, in the middle and at the end. Two different moderator coefficients were calculated. In one instance, it was assumed that the moderator density does not change with temperature; in the other instance, it was assumed that the moderator density changes as ordinary water about the operating temperature. In both instances, only the moderator temperature was altered; all other conditions were kept "normal." The results are shown in Table II.

TABLE II

*Temperature Coefficients of Reactivity*

| Case No. | Moderator coefficients no expansion $\Delta k/°$ C. | | | Moderator coefficients $H_2O$ expansion $\Delta k/°$ C. | | |
|---|---|---|---|---|---|---|
| | Start of life | Middle of life | End of life | Start of life | Middle of life | End of life |
| 1 | $-2.7 \times 10^{-4}$ | $-1.7 \times 10^{-4}$ | $-0.8 \times 10^{-4}$ | $-1.9 \times 10^{-3}$ | $-1.5 \times 10^{-3}$ | $-1.1 \times 10^{-3}$ |
| 7 | $-4.6 \times 10^{-4}$ | $-2.7 \times 10^{-4}$ | $-1.2 \times 10^{-4}$ | $-2.9 \times 10^{-3}$ | $-2.1 \times 10^{-3}$ | $-1.5 \times 10^{-3}$ |

The moderator coefficient without expansion is strongly negative, generally better than $-10^{-4}/°$ C. The moderator coefficient with expansion is about an order of magnitude greater than this. For these two cases, it is to be noted that the moderator coefficient with expansion is about $-2 \times 10^{-3}$ at the start of life. In other words, a 5° C. increase in operating temperature would reduce the initial reactivity by about 1%. If all effects (including leakage and xenon) were included, even less of a temperature increment would be required. With this degree of sensitivity about the operating point, it is feasible to consider some degree of shim control through regulated variation of the average moderator temperature during core life.

This possibility as well as the possibility for shimming through spectral-shift control of the moderator properties was further investigated by considering the change in $\overline{\xi \Sigma_s}/\text{Sum}_h N_i$ required to bring the maximum $k_{eff}$ achieved during core life down to unity for case 4. For this case, the maximum $k_{eff} = 1.0806$ and this occurs at start-up. A reduction of $\overline{\xi \Sigma_s}/\text{Sum}_h N_i$ of 12.4% would reduce this $k_{eff}$ to unity. A variation of this magnitude is certainly At 100,000 B.t.u./hr.-ft.²/° F.-ft., it is seen that the total fuel cycle costs for the uranium (prior art) loading amount to 4.6 mills/kwh. In comparison, all plutonium cases listed yield corresponding costs of less than 2.6 mills/kwh. In short, without striving for an optimum condition, the total fuel cycle costs for a comparable first generation PWR plant loaded with plutonium (in the practice of this invention) are only about half of those which can be achieved with slightly enriched uranium. For comparison, the second generation PWR, APWR with a two zone uranium loading and reduced fabrication costs gives total fuel cycle costs of 2.9 mills/kwh. as calculated by the designer. The plutonium costs for a first generation plant are even lower than this figure.

From examination of the individual cost components it appears that the largest cost item for the plutonium cases is the use charge. This can be reduced appreciably only by increasing the power density; i.e., by using fuel elements with higher surface to volume ratios or increasing the thermal conductivity of the fuel and increasing the heat flux. Perhaps, liquid metal cooling is indicated. It is for this reason that fuel costs were also estimated using a power density 5 times greater. This does not take into account possible side effects that may arise due to the increased operating temperatures required to attain such power densities. It is pointed out that these side effects may even prove to be beneficial. These calculations at higher power densities show that for the plutonium cases the total fuel costs can be reduced below 2 mills/kwh. It is to be noted that a similar calculation on the uranium fueled system shows only a nominal cost saving.

The next highest individual cost item for the plutonium cases is the burnup charge. Presumably this can be reduced somewhat by further lattice optimization, by spectral shift control, by the use of low parasitic absorbing cladding and moderator as indicated by the case 7 results, or by operation over a shorter life span. Each of these possibilities must, of course, be balanced against associated cost increases in other areas.

The third largest individual cost item for the plutonium cases is the fuel element fabrication cost. Since these unit costs were taken to be twice the unit costs for first generation uranium oxide fuel elements, there is much room for improvement here. Relatively simple fabrication procedures that are readily adaptable to remote operations can reduce these costs significantly.

Let us now qualitatively assess the possible influence on these costs of effects not yet considered.

Present experience indicates that uranium oxide fuel elements probably are limited to a life of about 60,000 MWD/Tonne by radiation damage. If this limitation is accepted, certainly the average core lives considered above are not attainable at the present time. Examination of Table III, shows that such a limitation will not appreciably affect plutonium fuel costs. This can be seen by comparing case 1 having a core life of 57,500 MWD/Tonne with case 4 having a core life of only 39,400 MWD/Tonne. For these two cases, the total fuel cycle costs are essentially identical. If one were limited by radiation damage to a specific core life, one would decrease the plutonium inventory accordingly, thereby the use charge would decrease; also, the burnup charge would decrease because of less parasitic absorption in fission products. These cost savings could then be used to balance the increased costs incurred for the other individual cost items.

The effects of non-uniform flux are similarly counteracted naturally with plutonium. For example, consider a uniformly loaded reactor. Initially, the flux will be greater near the center; therefore, the plutonium will tend to burn out faster in this region. As operation continues, the local $k_\infty$ near the center will not decrease appreciably (contrary to uranium behavior) and may even increase if fission product absorption is smaller than generally assumed herein; therefore, the overall reactivity of the system will tend to remain as calculated on a uniform basis or may even be greater. The core life corresponding to a given enrichment will, therefore, be about as great or greater than previously calculated. Further, due to more rapid burnout near the center, the local absorption will be decreased; hence, the flux will peak somewhat more in this area. However, the macroscopic fission cross section will be relatively low due to burnout; therefore, the power generation near the center of the core will tend to stay near the initial value. From these considerations, it would seem that a non-uniform flux distribution such as exists in a uniformly loaded reactor would, if anything, decrease fuel cycle costs below the values given in Table III and further, no serious problems would arise due to power peaking.

From the cost results given in Table III, plutonium price may be determined that would result in equal fuel cycle costs for both plutonium and uranium fueled systems. To be reasonable, consider the uranium loading case 8 and the plutonium loading case 4, both operating at the low power density. If the plutonium price were $22.30/gm. the fuel cycle costs from both these systems would be equal at 3.76 mills/kwh. If we consider the APWR second generation unit and case 4 operated at the higher power density, the fuel cycle costs would equalize at 2.47 mills/kwh. with a plutonium price of $18.70/gm. It must be realized that these costs were obtained without extensive optimization studies on plutonium systems and without taking credit for any side benefits that may be possible with plutonium. For example, operating and maintenance costs for a plutonium fuel system may be lower because of the need for fewer shutdowns for fuel replacement or rotation. Also, an optimum plutonium loading may result in appreciably lower shim control requirements; hence, an additional capital cost saving could be incurred. In short, a realistic estimate of the fuel value of plutonium cannot be made until a complete reactor plant has been optimized.

While preferred embodiments of this invention have been disclosed herein, many modifications thereof are patentable. This invention, then is not to be limited except insofar as is necessitated by the spirit of the prior art.

I claim as my invention:

A pressurized water nuclear reactor having a core containing the isotope Pu-240 in which the effective microscopic neutron absorption cross section of said Pu-240 in unconverted condition decreases as the time of operation of said reactor increases to compensate for loss of reactivity resulting from fission product buildup during reactor operation, said core being defined by the following parameters:

$$S/V = 5.36 \text{ to } 7.0.$$
$$\overline{\xi\Sigma_s}/\text{Sum}_h N_i = 150 \text{ to } 125$$
$$(\Sigma_a) \text{ mod}/\text{Sum}_h N_i = 2.84 \text{ to } 0.235$$
$$(\Sigma_a) \text{ clad}/\text{Sum}_h N_i = 3.00 \text{ to } 3.92$$

where $S/V$ is the ratio of surface area to volume of fuel, $\overline{\xi\Sigma_s}/\text{Sum}_h N_i$ is the lattice parameter, $\overline{\xi\Sigma_s}$ being the average of the logarithmic neutron energy loss per collision times the macroscopic scattering cross section averaged over all materials in the reactor, and $\text{Sum}_h N_i$ being the total number of uranium and plutonium atoms; and $(\Sigma_a)$ mod and $(\Sigma_a)$ clad are respectively the average thermal absorption cross section of the moderator and clad respectively, said reactor core being initially fuelled with natural uranium enriched with plutonium to an extent between 6.33 and 7.84 atomic percent plutonium having an isotopic distribution equal to 78% Pu-239; 12% Pu-240 and 10 Pu-241.

References Cited in the file of this patent

Dollezhal: 2nd U.N. Conference on Peaceful Uses of Atomic Energy, 1958, publ. by U.N., vol. 8, pp. 398–406.

Starr: Supra, vol. 13, pp. 287–290.

Winterberg: Supra, vol. 16, p. 675.

Hill: "Plutonium for Propulsion Reactors," Nuclear Engineering, February 1961, pp. 66, 67, 68.